(12) United States Patent
Sano et al.

(10) Patent No.: US 8,390,256 B2
(45) Date of Patent: Mar. 5, 2013

(54) CHARGE/DISCHARGE CONTROL CIRCUIT AND CHARGING TYPE POWER SUPPLY DEVICE

(75) Inventors: Kazuaki Sano, Chiba (JP); Wataru Sakamoto, Chiba (JP)

(73) Assignee: Seiko Instruments Inc. (JP)

( * ) Notice: Subject to any disclaimer, the term of this patent is extended or adjusted under 35 U.S.C. 154(b) by 323 days.

(21) Appl. No.: 12/869,128

(22) Filed: Aug. 26, 2010

(65) Prior Publication Data

US 2011/0050172 A1 Mar. 3, 2011

(30) Foreign Application Priority Data

Aug. 27, 2009 (JP) .................................. 2009-197395
Jul. 2, 2010 (JP) ................................. 2010-151543

(51) Int. Cl.
*H02J 7/00* (2006.01)
(52) U.S. Cl. ....................................................... 320/118
(58) Field of Classification Search .................. 320/118
See application file for complete search history.

(56) References Cited

U.S. PATENT DOCUMENTS

| | | | | | |
|---|---|---|---|---|---|
| 3,575,606 | A | * | 4/1971 | Bledsoe | 307/106 |
| 3,577,052 | A | * | 5/1971 | Bauer | 318/798 |
| 3,846,811 | A | * | 11/1974 | Nakamura et al. | 396/61 |
| 4,686,856 | A | * | 8/1987 | Vavra et al. | 73/204.15 |
| 5,130,634 | A | * | 7/1992 | Kasai | 320/160 |
| 5,748,463 | A | * | 5/1998 | Tsutsui et al. | 363/127 |
| 6,334,359 | B1 | * | 1/2002 | Suetake | 73/204.14 |
| 6,455,952 | B1 | * | 9/2002 | Wang | 307/15 |
| 6,795,656 | B1 | * | 9/2004 | Ikeuchi et al. | 398/197 |
| 8,210,743 | B2 | * | 7/2012 | Hasegawa | 374/178 |

FOREIGN PATENT DOCUMENTS

JP 2008-308115 A 11/1996

* cited by examiner

*Primary Examiner* — Arun Williams
(74) *Attorney, Agent, or Firm* — Brinks Hofer Gilson & Lione

(57) ABSTRACT

Provided are a charge/discharge control circuit and a charging type power supply device which include an intermediate terminal disconnection detection circuit having low current consumption. In the charge/discharge control circuit, a constant current circuit serving as an intermediate terminal disconnection detection circuit is provided to a terminal to which secondary batteries are connected, and includes a depletion type metal oxide semiconductor (MOS) transistor and a resistor connected between a gate terminal and a source terminal of the depletion type MOS transistor.

3 Claims, 3 Drawing Sheets

9, 10 : VOLTAGE DETECTION CIRCUIT
11 : CONTROL CIRCUIT

CHARGE/DISCHARGE CONTROL CIRCUIT AND CHARGING TYPE POWER SUPPLY DEVICE

RELATED APPLICATIONS

This application claims priority under 35 U.S.C. §119 to Japanese Patent Application Nos. 2009-197395 filed on Aug. 27, 2009 and 2010-151543 filed on Jul. 2, 2010, the entire content of which is hereby incorporated by reference.

BACKGROUND OF THE INVENTION

1. Field of the Invention

The present invention relates to a charge/discharge control circuit and a charging type power supply device which are capable of controlling charge/discharge of a battery unit including a plurality of secondary batteries connected in series, and more specifically, to a charging type power supply device with enhanced safety.

2. Description of the Related Art

Enhancing safety is one of the important issues for charging type power supply devices. In particular, the charging type power supply device equipped with a plurality of secondary batteries involves such a problem that charge/discharge control may fail due to disconnection of a connecting section between a battery unit and a charge/discharge control circuit (hereinafter, referred to as "intermediate terminal disconnection"). Taking measures against the intermediate terminal disconnection, a charging type power supply device as illustrated in FIG. 3 is known.

The charging type power supply device of FIG. 3 is configured as follows. Secondary batteries 2 and 3 are inserted in series between a positive power supply terminal 4 and a negative power supply terminal 6 of a charge/discharge control circuit 1. A connection point between the secondary batteries 2 and 3 is connected to an intermediate terminal 5 of the charge/discharge control circuit 1. A voltage of the secondary battery 2 is divided by a voltage dividing circuit 7, and the divided voltage is detected by a voltage detection circuit 9. An output of the voltage detection circuit 9 is supplied to a control circuit 11. When any one of the secondary batteries is over-charged or over-discharged, the control circuit 11 outputs a signal for turning OFF a charge/discharge control switch (not shown) provided between the secondary batteries and an external terminal of the charging type power supply device. Accordingly, the control circuit 11 is formed only of a logic circuit. Also for the secondary battery 3, an overcharge state or an overdischarge state is detected by means of a voltage dividing circuit 8 and a voltage detection circuit 10. A result of the detection is supplied to the control circuit 11 in the form of digital signal similarly. Therefore, when any one of the secondary batteries 2 and 3 is over-charged or over-discharged, the control circuit 11 operates to interrupt the connection between the secondary batteries and the outside so that the progress of overcharge or overdischarge halts. Those two secondary batteries have charging characteristics and discharging characteristics which are not exactly the same, and hence their individual detection controls on over-charge/overdischarge are necessary.

A constant current circuit 14 allows a constant current to flow from the positive power supply terminal 4 to the intermediate terminal 5. The constant current circuit 14 uses a depletion type metal oxide semiconductor (MOS) transistor in which a gate terminal and a source terminal are connected.

The conventional charging type power supply device is configured as described above and operates as follows to detect the intermediate terminal disconnection and stop charging/discharging. When the intermediate terminal 5 and the secondary batteries 2 and 3 are disconnected, the constant current of the constant current circuit 14 flows into the voltage dividing circuit 8, and accordingly a voltage of the intermediate terminal 5 is pulled up to that of the positive power supply terminal 4. Applied with a voltage higher than normal, the voltage dividing circuit 8 detects the overcharge. Therefore, the control circuit 11 outputs the signal for turning OFF the charge/discharge control switch.

In other words, because the constant current circuit 14 is provided between the positive power supply terminal 4 and the intermediate terminal 5, even if the intermediate terminal 5 is disconnected, the secondary batteries are prevented from being over-charged or over-discharged. Therefore, a charging type power supply device with high level of safety may be provided (see, for example, Japanese Patent Application Laid-open No. Hei 08-308115).

However, there is a problem in that it is difficult for the conventional constant current circuit to set a current value necessary and sufficient to detect the intermediate terminal disconnection.

Under the intermediate terminal disconnection situation, the potential of the intermediate terminal is fixed by means of the voltage dividing circuits connected at its upstream and downstream. For that reason, it is necessary that the constant current circuit pull up the intermediate terminal with a current value exceeding a current value of the voltage dividing circuits. Because the voltage dividing circuit is formed of resistive elements, the setting of the constant current value needs to be made taking into account manufacturing fluctuations in resistive elements, with the result that a large redundant constant current is necessary.

Meanwhile, the current of the constant current circuit is an unbalance current for the batteries connected, and hence a too large constant current is responsible for unbalancing the battery voltages.

SUMMARY OF THE INVENTION

In order to solve the conventional problem, a charge/discharge control circuit according to the present invention is configured as follows.

In the charge/discharge control circuit, a constant current circuit serving as an intermediate terminal disconnection detection circuit is provided to a terminal to which secondary batteries are connected, and is configured to have a constant current value which is variable in accordance with resistance fluctuations in resistive elements of dividing resistors. More specifically, the constant current circuit includes a depletion type metal oxide semiconductor (MOS) transistor and a resistor connected between a gate terminal and a source terminal of the depletion type MOS transistor.

The intermediate terminal disconnection detection circuit includes the constant current circuit having the above-mentioned configuration, and hence the constant current value may be made smaller if there are upward fluctuations in resistances of the resistive elements forming a voltage dividing circuit to eliminate the need for a large pull-up current, and may be made larger if there are downward fluctuations in the resistances of the resistive elements forming the voltage dividing circuit to arise the need for a large pull-up current, to thereby obtain a constant current value necessary and sufficient to detect intermediate terminal disconnection.

DETAILED DESCRIPTION OF THE PREFERRED EMBODIMENT

Figure 1:
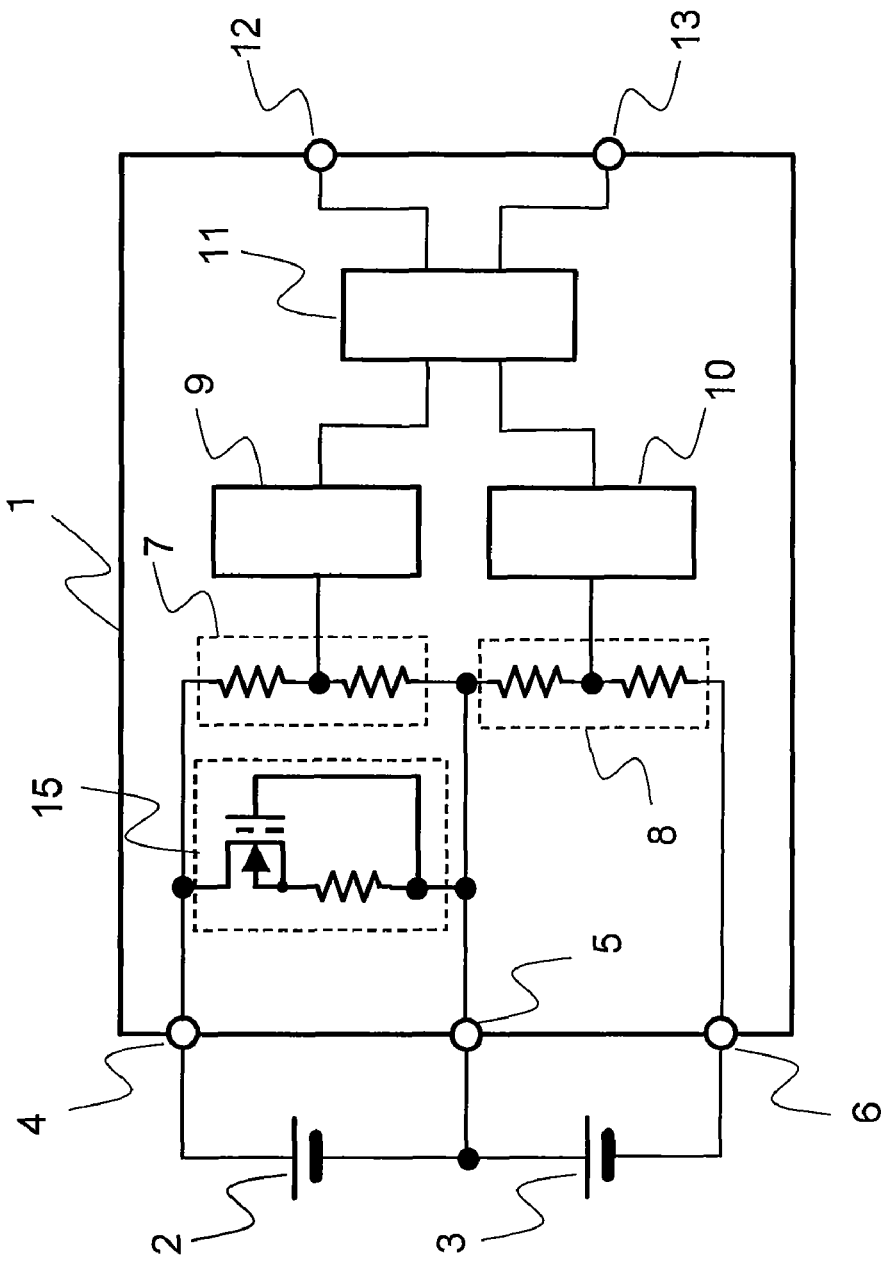
FIG. 1 is a block diagram illustrating an exemplary charging type power supply device according to the present invention.

FIG. 1 is a block diagram illustrating an exemplary charging type power supply device according to the present invention.

The charging type power supply device according to the present invention includes secondary batteries 2 and 3 forming a battery unit, and a charge/discharge control circuit 1. The secondary batteries 2 and 3 are connected in series between a positive power supply terminal 4 and a negative power supply terminal 6 of the charge/discharge control circuit I. A connection point between the secondary batteries 2 and 3 is connected to an intermediate terminal 5.

The charge/discharge control circuit 1 includes voltage dividing circuits 7 and 8, a control circuit 11, and a constant current circuit 15. The voltage dividing circuit 7 is connected to the positive power supply terminal 4 and the intermediate terminal 5. The voltage dividing circuit 8 is connected to the negative power supply terminal 6 and the intermediate terminal 5. The control circuit 11 is connected to respective output terminals of the voltage dividing circuits 7 and 8. The constant current circuit 15 is connected to the positive power supply terminal 4 and the intermediate terminal 5, and serves as an intermediate terminal disconnection detection circuit. Output terminals of the control circuit 11 are connected to control terminals 12 and 13.

The constant current circuit 15 includes a depletion type metal oxide semiconductor (MOS) transistor and a resistor connected between a gate terminal and a source terminal of the depletion type MOS transistor. Here, the resistor connected between the gate terminal and the source terminal is the same type of resistor used for the voltage dividing circuit 8.

The charging type power supply device described above operates as follows to have a function of detecting the intermediate terminal disconnection to protect the secondary batteries.

A voltage of the secondary battery 2 is divided by the voltage dividing circuit 7 to be output as a divided voltage. The divided voltage is detected by a voltage detection circuit 9. An output of the voltage detection circuit 9 is supplied to the control circuit 11. When any one of the secondary batteries 2 and 3 is over-charged or over-discharged, the control circuit 11 outputs a signal through the control terminals 12 and 13 for turning OFF a charge/discharge control switch (not shown) provided between the secondary batteries 2 and 3 and an external terminal. Accordingly, the control circuit 11 is formed only of a logic circuit.

Also for the secondary battery 3, similarly, an overcharge state or an overdischarge state is detected by means of the voltage dividing circuit 8 and a voltage detection circuit 10. A result of the detection is supplied to the control circuit 11 in the form of digital signal similarly.

Therefore, when any one of the secondary batteries 2 and 3 is over-charged or over-discharged, the control circuit 11 operates to interrupt the connection to the outside so that the progress of overcharge or overdischarge halts. The secondary batteries 2 and 3 have charging characteristics and discharging characteristics which are not exactly the same, and hence their individual detection controls on overcharge/overdischarge are necessary.

While the intermediate terminal 5 is normally connected, the constant current circuit 15 allows a current to flow from the positive power supply terminal 4 to the intermediate terminal 5.

Next, an operation in a case where the intermediate terminal 5 is disconnected is described.

When the intermediate terminal 5 and the secondary batteries 2 and 3 are disconnected, the constant current of the constant current circuit 15 flows into the voltage dividing circuit 8, and accordingly a voltage of the intermediate terminal 5 is pulled up to that of the positive power supply terminal 4. Applied with a voltage higher than normal, the voltage dividing circuit 8 detects the overcharge. Therefore, the control circuit 11 outputs the signal for turning OFF the charge/discharge control switch.

Here, because the resistor is connected between the gate terminal and the source terminal of the depletion type MOS transistor, a gate terminal voltage of the depletion type MOS transistor is reduced compared with a source terminal voltage thereof by an amount of voltage drop by the resistor. In a case where there are upward fluctuations in resistances of the resistive elements forming the voltage dividing circuit, the voltage applied across the resistor becomes higher and accordingly the source voltage of the depletion type MOS transistor increases to reduce the current value. On the contrary, in a case where there are downward fluctuations in the resistances of the resistive elements forming the voltage dividing circuit, the voltage applied across the resistor becomes lower and accordingly the source voltage of the depletion type MOS transistor reduces to increase the current value.

As described above, the resistor is connected between the gate terminal and the source terminal of the depletion type MOS transistor, to thereby adjust the constant current value against manufacturing fluctuations in resistive elements to obtain a necessary and sufficient pull-up current.

Figure 2:
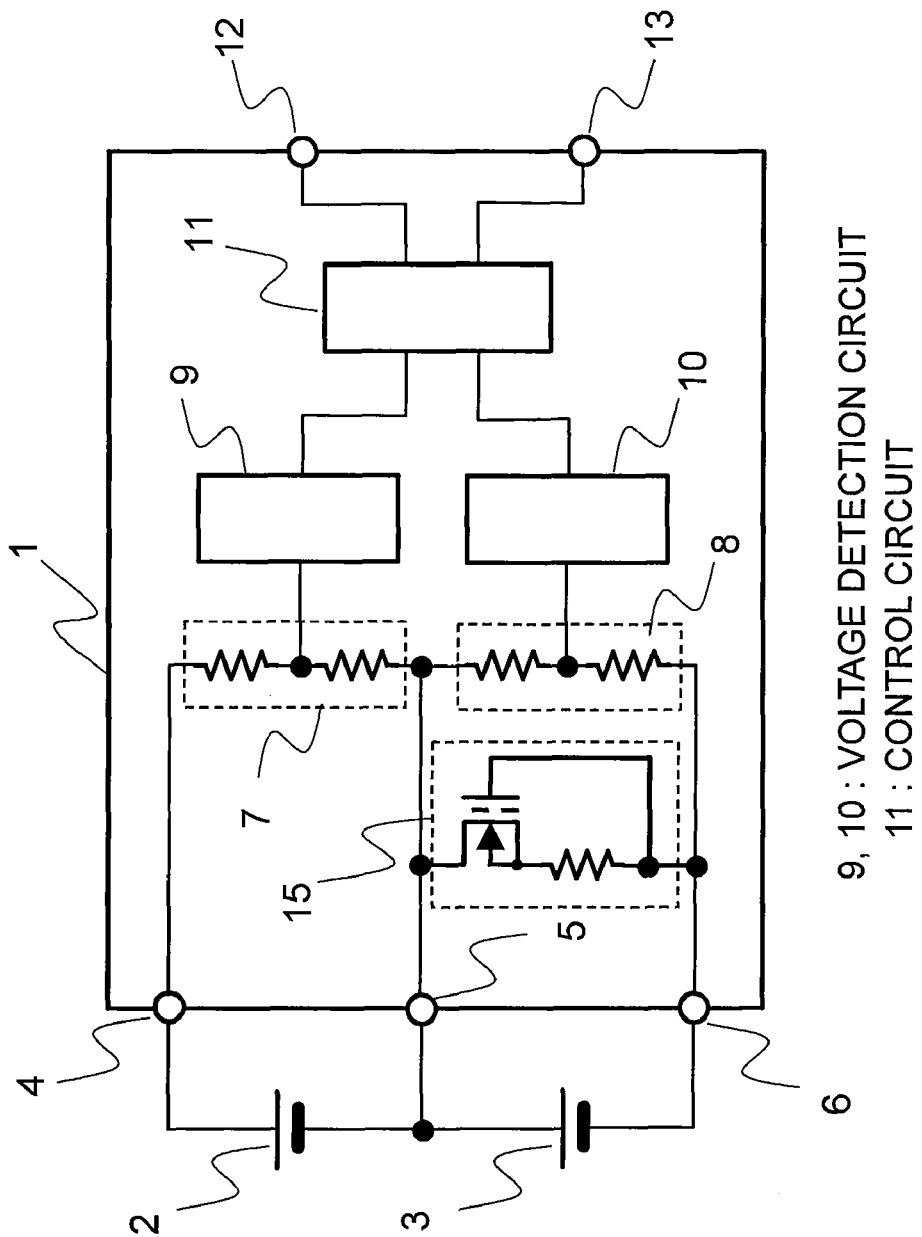
FIG. 2 is a block diagram illustrating another exemplary charging type power supply device according to the present invention.
Figure 3:
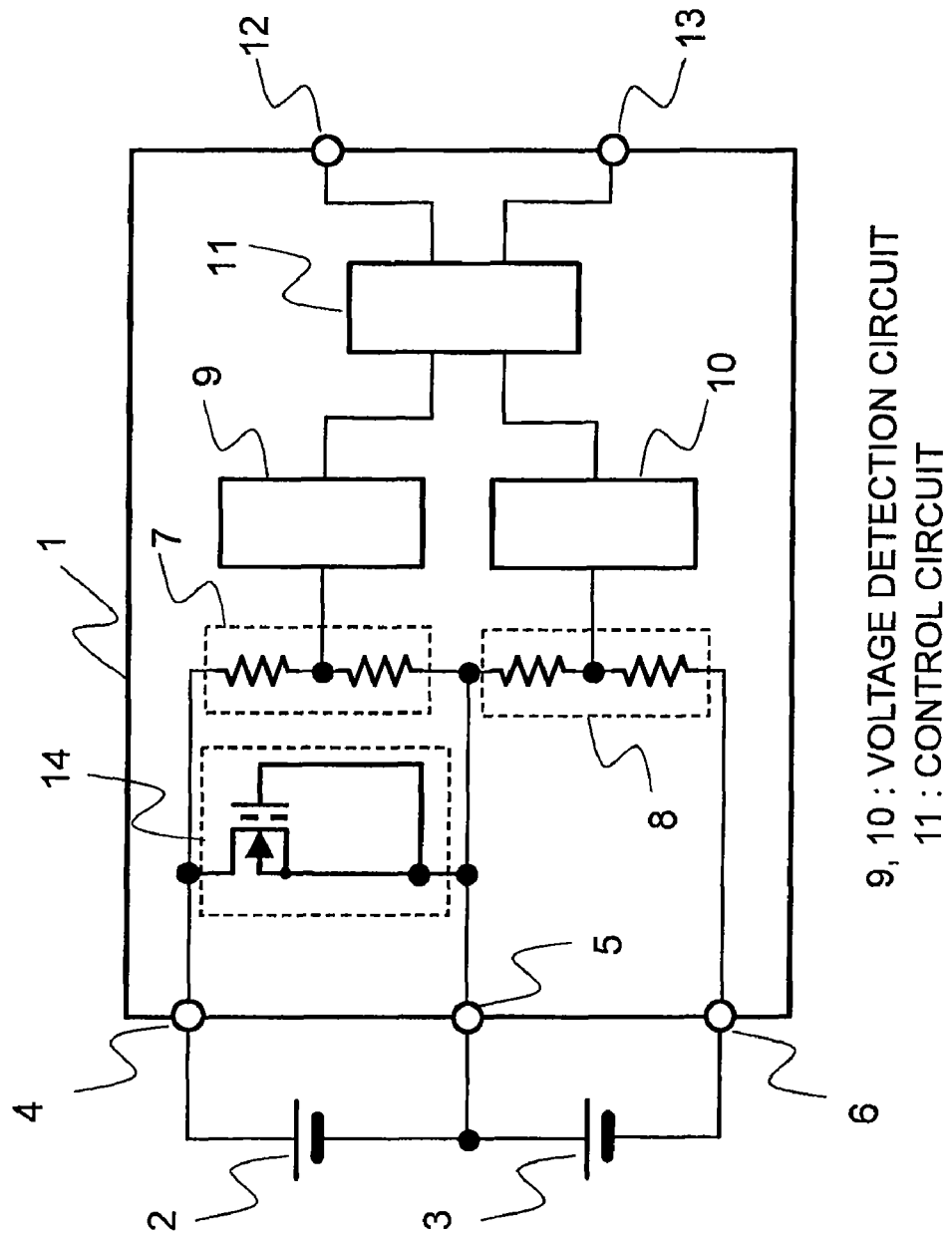
FIG. 3 is a block diagram illustrating a conventional charging type power supply device.

FIG. 2 is a block diagram illustrating another exemplary charging type power supply device according to the present invention.

In a charge/discharge control circuit 1 of FIG. 2, a constant current circuit 15 serving as an intermediate terminal disconnection detection circuit is connected between an intermediate terminal 5 and a negative power supply terminal 6. Similarly to FIG. 1, the constant current circuit 15 includes a depletion type MOS transistor and a resistor connected between a gate terminal and a source terminal of the depletion type MOS transistor. Here, the resistor connected between the gate terminal and the source terminal is the same type of resistor used for a voltage dividing circuit 7.

The charging type power supply device described above operates as follows to have a function of detecting the intermediate terminal disconnection to protect the secondary batteries.

While the intermediate terminal 5 is normally connected, the constant current circuit 15 allows a current to flow from the intermediate terminal 5 to the negative power supply terminal 6.

Next, an operation in a case where the intermediate terminal 5 is disconnected is described.

When the intermediate terminal 5 and the secondary batteries 2 and 3 are disconnected, the constant current of the constant current circuit 15 flows from the voltage dividing circuit 7, and accordingly a voltage of the intermediate terminal 5 is pulled down to that of the negative power supply terminal 6. Applied with a voltage higher than normal, the voltage dividing circuit 7 detects the overcharge. Therefore, the control circuit 11 outputs the signal for turning OFF the charge/discharge control switch.

Here, because the resistor is connected between the gate terminal and the source terminal of the depletion type MOS transistor, a gate terminal voltage of the depletion type MOS transistor is reduced compared with a source terminal voltage thereof by an amount of voltage drop by the resistor. In a case where there are upward fluctuations in resistances of the resistive elements forming the voltage dividing circuit, the voltage applied across the resistor becomes higher and accordingly the source voltage of the depletion type MOS transistor increases to reduce the current value. On the contrary, in a case where there are downward fluctuations in the resistances of the resistive elements forming the voltage dividing circuit, the voltage applied across the resistor becomes lower and accordingly the source voltage of the depletion type MOS transistor reduces to increase the current value.

As described above, the resistor is connected between the gate terminal and the source terminal of the depletion type MOS transistor, to thereby adjust the constant current value against manufacturing fluctuations in resistive elements to obtain a necessary and sufficient pull-up current.

Note that, the charging type power supply device according to the present invention has been described taking an example where two secondary batteries are provided, but the same effects can also be obtained in a case where three or more secondary batteries are provided, as long as the intermediate terminal disconnection detection circuit is provided every other secondary battery.

What is claimed is:

1. A charge/discharge control circuit for controlling charge/discharge of a battery unit comprising a plurality of secondary batteries connected in series, the charge/discharge control circuit comprising:
   at least one intermediate terminal connected to a connection terminal between the plurality of secondary batteries of the battery unit;
   a plurality of dividing resistors provided corresponding to the plurality of secondary batteries; and
   an intermediate terminal disconnection detection circuit connected to the at least one intermediate terminal,
   wherein the intermediate terminal disconnection detection circuit comprises a constant current circuit having a constant current value which is variable in accordance with fluctuations in resistances of resistive elements of the plurality of dividing resistors:
   wherein the intermediate terminal disconnection detection circuit comprises a resistor which is the same type as the plurality of dividing resistors.

2. A charge/discharge control circuit according to claim 1, wherein the constant current circuit comprises:
   a depletion type metal oxide semiconductor (MOS) transistor; and
   a resistor connected between a gate terminal and a source terminal of the depletion type MOS transistor.

3. A charging type power supply device, comprising:
   a battery unit comprising a plurality of secondary batteries connected in series;
   the charge/discharge control circuit according to claim 1 for controlling charge/discharge of the battery unit; and
   a charge/discharge control switch controlled by the charge/discharge control circuit.

* * * * *